US012778152B2

(12) United States Patent
Linardakis et al.

(10) Patent No.: US 12,778,152 B2
(45) **Date of Patent: *Nov. 3, 2026**

(54) INFANT FORMULA COMPOSITION AND METHODS OF MANUFACTURE

(71) Applicant: The Bêne Baby Company LLC, Nekoosa, WI (US)

(72) Inventors: Nikos Linardakis, Nekoosa, WI (US); James Esselman, Neekoosa, WI (US)

(73) Assignee: The Bêne Baby Company LLC, Nekoosa, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/575,554

(22) Filed: Mar. 23, 2026

(65) Prior Publication Data

US 2026/0223876 A1 Aug. 6, 2026

Related U.S. Application Data

(63) Continuation-in-part of application No. 17/977,662, filed on Oct. 31, 2022, now Pat. No. 12,616,233.

(60) Provisional application No. 63/338,351, filed on May 4, 2022.

(51) Int. Cl.

| | |
|---|---|
| ***A23C 9/15*** | (2006.01) |
| ***A23C 9/152*** | (2006.01) |
| ***A23C 9/158*** | (2006.01) |
| ***A23L 33/00*** | (2016.01) |
| ***A23P 10/40*** | (2016.01) |

(52) U.S. Cl.

CPC .............. *A23C 9/15* (2013.01); *A23C 9/1522* (2013.01); *A23C 9/1528* (2013.01); *A23C 9/158* (2013.01); *A23L 33/40* (2016.08); *A23P 10/40* (2016.08)

(58) Field of Classification Search

CPC ....................................................... A23L 33/40

See application file for complete search history.

(56) References Cited

U.S. PATENT DOCUMENTS

2006/0210697 A1 9/2006 Mower

FOREIGN PATENT DOCUMENTS

| | | | | |
|---|---|---|---|---|
| CN | 102283288 A | | 12/2011 | |
| CN | 112167360 A | | 1/2021 | |
| WO | WO-2013138906 A1 | * | 9/2013 | ............. A23L 33/40 |
| WO | WO-2017030330 A1 | * | 2/2017 | ............... A23C 9/00 |

OTHER PUBLICATIONS

Kao et al., “Goat Milk Consumption Enhances Innate and Adaptive Immunities and Alleviates Allergen-Induced Airway Inflammation in Offspring Mice,” Frontier in Immunology, vol. 11, (Feb. 2020), pp. 1-14.

Long et al., Lipids in infant formulas: Current and future innovations, Lipid Technology, vol. 25, No. 5, Jun. 2015, pp. 127-129. (Year: 2013).

Markiewicz-Keszycka et al., “Fatty Acid Profile of Milk-A Review”, Bull. Vet. Inst. Pulawy., 57, 2013, pp. 135-139. (Year: 2013).

nutritionvalue.org , “Goat’s milk, whole”, https://www.nutritionvalue.org/Goat%27s_milk%2C_whole_11116000_nutritional_value.html?size=100+g, downloaded Apr. 22, 2025 (Year: 2025).

Prosser et al., “Composition of the non-protein nitrogen fraction of goat whole milk powder and goat milk-based infant and follow-on formulae”, International Journal of Food Science and Nutrition, 59 (2), Mar. 2008, pp. 123-133. (Year: 2008).

Prosser, C.G., “Compositional and functional characteristics of goat milk and relevance as a base for infant formula”, Journal of Food Science, vol. 86, Iss. 2, 2021, pp. 257-265. (Year: 2021).

Van Leeuwen et al., “Goat Milk Oligosaccharides: Their Diversity, Quantity, and Functional Properties in Comparison to Human Milk Oligosaccharides,” Journal of Agricultural and Food Chemistry, 68, (2020), pp. 13469-13485.

* cited by examiner

*Primary Examiner* — Elizabeth Gwartney

(74) *Attorney, Agent, or Firm* — Workman Nydegger

(57) ABSTRACT

Disclosed are baby formula compositions and methods of making thereof. In some embodiments, the baby formula composition includes at least one goat milk isolate or goat milk derivative, such as at a concentration of approximately 40% to 80% by weight, and a variety of other added nutritional components, such as added lactose and one or more added oils that provide at least one of unsaturated fats or medium-chain fatty acids. The baby formula composition can be provided as a powder, to be mixed with water, drink, or food and fed to a baby or toddler, or it can be provided as a liquid. The baby formula composition can include about 40-80% by combined weight of at least one goat milk isolate or goat milk derivative. The weight ratio of at least one goat milk isolate or goat milk derivative to added lactose can be at least about 1.5:1 and/or a weight ratio of goat milk isolate or derivative to one or more added oils can be at least about 1.9:1.

20 Claims, No Drawings

INFANT FORMULA COMPOSITION AND METHODS OF MANUFACTURE

CROSS REFERENCE TO RELATED APPLICATION

This Application is a continuation-in-part of U.S. application Ser. No. 17/977,662, filed Oct. 31, 2022, now U.S. Pat. No. 12,616,233, which claims the benefit of U.S. Provisional Application No. 63/338,351, filed May 4, 2022, which are incorporated by reference in their entirety.

BACKGROUND

Technical Field

This disclosure relates to infant formula compositions and methods of manufacturing the same.

Related Technology

Typically, baby formulas are designed to deliver important nutrients and vitamins to infants and toddlers as they develop. These nutrients are critical for development in key areas and functions, and often attempt to mimic the nutritional profile of human breast milk. Human milk contains a remarkably long list of different nutrients, vitamins, essential proteins, and much more. It even includes millions of live cells, made up of immune-boosting white blood cells and stem cells.

Baby formulas are typically categorized as a dairy substitute and classically include a blend of fats, proteins and carbohydrates. Many baby formulas utilize high fructose corn syrup and derivatives of palm oils and soy protein in the attempt to mirror breast milk. However, palm oil derivatives and soy derivatives can be irritating to some infants and often provide poor nutritional value. Many formulas are also marketed and directed toward infant populations, rather than older babies and toddlers. As many formulas are designed for young infants, older babies and toddlers may not get the proper nutritional profile and can even experience gastric discomfort when transitioning from formula-based nutrition to solid foods. This transition can be particularly difficult when transitioning to lactose-heavy foods from a relatively lactose-light diet. There are concerns that baby formula is not as healthy for babies as breast milk and babies may actually become ill if the formula is improperly mixed or administered.

According to the World Health Organization (WHO), breastfeeding is considered the best form of nutrition and feeding for infants. This may not be possible for all parents and may be impossible in some cases. The fast pace of society has changed the dynamics of the home life, and some potential mothers have careers and delay having children until later in life, which also leads to more infant formula feeding since these mothers may continue working outside the home, and the child may be cared for by a nanny or caretaker and receive nutrition through formula, food and water. Babies require an adequate amount of calories (energy), nutrients, minerals, and other nutritional needs to maintain their growth and development.

Conventional baby typically formulas come in three varieties: soy-based, specialized formulas, or milk-based. Soy-based formulas use soy proteins and often contain no lactose. Soy-based formulas may help babies who are allergic to lactose contained in cow milk. However, according to the American Academy of Pediatrics (AAP), up to half of babies who are allergic to milk protein are also sensitive to soy protein. Additionally, although whole soybeans provide all essential amino acids required by the human body, soy protein isolates may not provide such a robust nutritional profile. During processing of soybeans, valuable vitamins and minerals can be stripped away, leaving a nutritionally depleted product. Processed soy products (and soy protein isolates) may also be higher in phytoestrogen isoflavones (especially genistein and daidzein), which are structurally similar to the human female hormone 17-beta-estradiol and can cause hormone disruption, particularly in male babies. Hormone disruption at any level is particularly undesirable in developing babies and especially for those with a family history or genetic predisposition for estrogen-receptor diseases, influencing hormone-dependent states and potential negative effects on sexual development, reproductive function, neurobehavioral development and other functions as immune and thyroid function abnormalities.

Specialized formulas are designed for babies with certain diseases or disorders. For example, premature babies typically require specialized formula. It is important to follow all guidelines and instructions for feeding with specialized formulas because they are different from typical baby formulas. Babies who are not in need of specialized formula should not be fed specialized formula.

Milk-based formulas typically utilize cow milk and are the most prevalent types of formula on the market. The cow milk in infant formula is treated to make the protein more digestible, milk sugar (lactose) is added to bring it closer to breast milk, and vegetable oil replaces the butterfat. Cow milk-based formulas may contain higher levels of a specific casein protein (e.g., alpha S-1 casein), which can be a source of allergens and a cause of cow milk protein (CMP) allergy. Studies have linked cow milk-based formulas to a higher risk of necrotizing enterocolitis (NEC) in premature infants.

Additionally, the raising of cows to supply milk for formulas is believed by some to negatively impact the environment. For example, cows need ample room for grazing and they mostly eat grass, meaning thousands of acres of land worldwide must be devoted to growing grass purely to support the feeding needs of cows. Depending on the feed, cows can produce large amounts of methane. Cow farming often releases hormones and antibiotics into the environment. As cows are generally kept in concentrated animal feeding operations (CAFOs), sometimes called feedlots, the use of hormones to bolster growth and antibiotics to reduce infection are common. Antibiotics are used in feedlots to treat and prevent livestock disease and bolster animal growth and nourishment efficiency of the feed. These non-therapeutic uses involve long-term, low-level dosing that creates an appropriate environment for bacteria to develop antibiotic resistance. Several antibiotics used in animal agriculture are the same as or similar to those used in human medicine; transference of antibiotic-resistant microbes from animals to humans could further undermine antibiotic effectiveness against human disease.

In view of the foregoing, there is clearly a long felt and unmet need for new baby formulas that solve problems associated with existing formulas.

SUMMARY

Disclosed are baby formula compositions and methods of administering and making thereof. In some embodiments, the baby formula composition includes goat milk and a variety of other nutritional components. As used herein, “goat milk” includes raw and/or pasteurized goat milk, derivatives of goat milk (e.g., nonfat dry goat milk, evaporated goat milk or goat milk yogurt) and/or isolates from goat milk (e.g., goat milk proteins and/or goat whey proteins). In some embodiments, the baby formula composition is provided as a powder, to be mixed with water. drink or food to be fed to a baby and/or toddler. In some embodiments, the baby formula composition is suitable for babies at least 12 months in age or older. In some embodiments, the baby formula composition is formulated to be suitable for babies aged 12-18 months (1-1.5 years old). In some embodiments, the baby formula composition is formulated to be suitable for toddlers aged 18-36 months (1.5-3 years old), such as toddlers aged 24 or 30 months (2-2.5 years old). In some embodiments, the baby formula composition is formulated to be suitable for babies under 12 months, such as from birth to 12 months of age.

Disclosed are compositions and methods for administering an edible powdered mix, to be blended with water, drink or food, that provides healthy nutrition for infants and toddlers for proper growth and development. The nutritional profile of the edible powdered mix helps prevent childhood obesity by the administration of a nutritional composition, similar to human breast milk, containing a formulation of short and medium chained fatty acids, digestible carbohydrates, necessary minerals and vitamins, less allergenic proteins (such as alpha-S-2 casein proteins, reduced alpha-S-1 casein proteins), and healthier oligosaccharides, with the use of hypoallergenic goat milk and natural plant-based oils. By decreasing the amount of processed sugars consumed in the developmental and formative years, childhood obesity and diabetes can be reduced and/or prevented. The formula composition, which is advantageously free of GMOs and soy, free of corn syrup solids, gluten-free, and free of cow milk proteins, provides a powdered mixture to be blended with water, other liquid or drink, or food for use as infant nutritional food supplement, as a natural breast milk equivalent, and believed to be useful in reducing the risk or severity of childhood obesity, diabetes, and other diseases related to alpha-S-1 casein allergies and consumption of processed sugars early in life. The formula composition can also be free of fucoidan, which can cause diarrhea, loose stools, bloating, and stomach upset, has anti-coagulant (blood thinning) effects, can provide excess dietary iodine, which can cause thyroid disorders, can include heavy metals, and can be harmful to infants with seafood and seaweed allergies. In addition, fucoidan is not easily digested or absorbed by the human stomach or small intestine because it is a complex, water-soluble dietary fiber.

The key to providing a nutritionally effective infant formula is to match as closely as possible the physical and nutritional properties of human breast milk. Milk is a natural emulsion, which means it is a fine dispersion of tiny droplets of fats and oils suspended in water. Milk also contains important components including proteins, sugars, minerals, salts, and trace elements. Human breast milk has an average composition (by weight percentage) of 87.5% water, 12.5% total solids, 1.0-1.5% protein and non-protein nitrogen compounds, 3.0-4.0% lipids, 7.0-7.5% carbohydrates, and 0.2% ash or minerals.

In some embodiments, the disclosed baby formula compositions may include one or more of natural sugars (i.e., lactose and other mono- and disaccharides, such as fructose, glucose, and sucrose that are not a hydrolysis product of a polysaccharide such as starch or fucoidan), proteins (e.g., casein and whey), fats, oligosaccharides, sunflower oil, arachidonic acid (ARA), docosahexaenoic acid (DHA), calcium salts, potassium salts, sodium salts, magnesium salts, iron, and vitamins and minerals. The carbohydrate component of disclosed baby formula compositions may be provided primarily or solely by oligosaccharides in the goat milk component and natural sugars (e.g., lactose), and may omit potentially harmful polysaccharides such as fucoidan, derivatives of fucoidan, carrageenan, and the like. The lipid component of the disclosed baby formula compositions can be a mixture of naturally occurring fats from goat milk, and preferably further includes one or more of coconut oil or vegetable oil, with or without marine-derived fats. The lipid component of the disclosed baby formula compositions preferably consists essentially of short- and medium-chain triglycerides, with lesser or no amount of long-chain triglycerides fats and proteins from cow milk, which are poorly digested and have limited absorption. Short-chain fatty acids contain less than 6 carbons; medium-chain fatty acids contain 6-12 carbons, and long-chain fatty acids contain more than 12 carbons.

Goat milk is rich in short-chain fatty acids (SCFAs) and medium-chain fatty acids (MCFAs), such as caprylic (C8) and capric (C10) acid. The short-chain triglycerides and C8 and C10 medium-chain triglycerides are fat molecules that are also uniquely hydrophilic, which provides a natural homogenization, where the fat molecules are evenly dispersed throughout the goat milk and do not separate (as they do in cow milk) into a thick layer of cream on top of the non-homogenized milk (which typically contains greater than 70% long-chain triglycerides). The smaller fat molecules also lack agglutinin (a protein which causes clumping of fat molecules and is abundant in cow milk), which further reduces curdling. Infants and toddlers do not have enough lipase enzymatic activity to break down the fats and proteins in cow milk due to their size and agglomeration.

The short-chain triglycerides (SCT) and medium-chain triglycerides (MCT) of goat milk also have additional health benefits over the long-chain triglycerides (LCT) of cow milk. For example, short- and medium-chain triglycerides can help lower cholesterol, and can prevent and dissolve cholesterol deposits. The abundant short- and medium-chain triglycerides in goat milk play an important role in healthy development, absorption, and digestion compared to the long-chain triglycerides found more abundantly in cow milk. The natural homogenization of goat milk means there is no need for additional mechanical homogenization, which can destroy and/or denature valuable nutrients.

Goat milk beneficially contains natural lactoferrin (not synthetic lactoferrin from rice or other sources), which has been shown to be a natural antioxidant, anti-viral and anti-bacterial. Lactoferrin has also been found in breast milk to provide protection against viruses and bacteria. It is also found alongside milk fat globule membrane (MFGM), a globular glycoprotein found in the secretory milk fluid, especially colostrum, which is known for its immune-boosting benefits for newborns.

Goat milk also contains beneficial and healthy oligosaccharides, many of which are structurally similar to oligosaccharides in human breast milk. Human breast milk contains more than 80 milk oligosaccharides (hMOS), with 247 varieties observed and 162 hMOS structurally characterized. Because of its prebiotic and anti-infective properties, hMOS are a major source for early life colonization of gut microbiota in infants. Recent studies have shown that goat milk contains the highest level of oligosaccharides among all domestic animals and has significant similarities to human milk oligosaccharides from a structural point of view. The beneficial oligosaccharides profile of goat milk improves the immune system and gut microbiome, with its attendant benefits.

Beneficially, the disclosed baby formula compositions enable an easier transition to lactose-based dairy products from baby formulas and/or non-lactose-based products. Enabling an easier transition also beneficially reduces the prevalence of lactose intolerance in wider populations. Additionally, the disclosed baby formula compositions may be easier for infant and/or toddler digestive systems to handle and digest. In other words, the disclosed baby formula compositions may be easier on infant and/or toddler digestive systems, resulting in better fed infants and/or toddlers.

Further, the disclosed baby formula compositions may beneficially exclude soy, corn syrup, palm oil and/or derivates of soy, corn syrup and/or palm oil. These components are known to have long-term negative health effects, be tough on young bodies, and be detrimental to the environment. By excluding corn syrup and/or sugars derived from corn syrup, less sugar will be consumed during the formative and developmental years, enabling improved nutritional health and development. Decreased sugar consumption during developmental years correlates to fewer children (and eventual adults) suffering from diabetes, heart disease and obesity. The disclosed baby formula compositions may further exclude added hormones, gluten, antibiotics and/or genetically modified organisms (GMOs).

As introduced above, goat milk proteins contained in the disclosed baby formula compositions are easy to digest because they produce softer curds in the stomach compared to curds produced from cow milk. Goat milk has lower levels of alpha-S-1-casein protein compared to cow milk. Goat milk has higher levels of the beneficial alpha-S-2-casein protein, which is hypoallergenic, compared to cow milk. Omitting fucoidan further enhances ease of digestion and elimination of harmful effects of this polysaccharide noted above.

Vitamins and supplements such as vitamin K (important for the circulatory system), vitamin D (important for bone growth), vitamin B12 (supports neurological functions), and iron (important for oxygen flow throughout the body) are important elements that are advantageously included in the disclosed formula compositions.

Also beneficially, the disclosed baby formula compositions are sustainable and environmentally friendly. Goats require approximately one-tenth the amount of land as cows. For example, a single cow needs roughly 1.5 acres of land per year for grazing. In comparison, a single goat only needs 0.15 acres-meaning 6-8 goats can safely and comfortably graze on the same amount of land needed for a single cow. Goats generally consume fewer hormones as FDA regulations prohibit the use of hormones in goats.

Goats are also foragers and browsers, meaning they use all edible resources in their habitat as opposed to cows, who primarily consume grass. Because goats get over 60% of their nutrition from berries, leaves and woody plants, they do not overgraze land as quickly as cows do. This means goats do not need additional grazing land if grass is scarce and allows farmers to preserve water that must otherwise be used when maintaining grass-exclusive grazing areas.

Goats are also more efficient than cows in converting feed grain to milk. For every 70 pounds of dairy ration fed to the average goat, it will produce one more gallon of milk than the average cow. Goats are able to produce sufficient amounts of milk with considerably less methane emission than cows. Goats have more positive effects on their environment than cows, are highly efficient at clearing a space of invasive species. This allows native foliage to thrive while encouraging and supporting biodiversity. For example, native bee populations generally prefer native foliage and are supported by growth and maintenance of native foliage. Goats produce less manure than cows, reducing the amount of harmful chemicals that may enter waterways.

Goat farming beneficially allows for ease of herd management, improved grazing practices, pasture maintenance, beneficial animal welfare and social well-being, and quality sustainability in feeding, milking and reproductive practices. Other milks were previously considered, such as sheep milk, donkey milk, camel milk, yak milk and buffalo milk. However, these milks are not commercially viable/available and/or they have negative consumer perception. Accordingly, formula compositions disclosed herein may omit sheep milk, donkey milk, camel milk, yak milk and buffalo milk.

This summary is provided to introduce a selection of concepts in a simplified form that are further described below in the detailed description. This summary is not intended to identify key features or essential features of the claimed subject matter, nor is it intended to be used as an indication of the scope of the claimed subject matter.

DETAILED DESCRIPTION

Disclosed are baby formula compositions and methods of administering and making thereof. In some embodiments, the baby formula composition includes goat milk and a variety of other nutritional components. As used herein, "goat milk" includes raw and/or pasteurized goat milk, derivatives of goat milk (e.g., evaporated goat milk or goat milk yogurt) and/or isolates from goat milk (e.g., whey and/or goat milk proteins). In some embodiments, the baby formula composition is provided as a powder, to be mixed with water, drink or food and fed to a baby or toddler. In some embodiments, the baby formula composition is suitable for babies at least 12 months in age or older. In some embodiments, the baby formula composition is suitable for babies aged 12-18 months (1-1.5 years old). In some embodiments, the baby formula composition is suitable for toddlers aged 18-36 months (1.5-3 years old), such as toddlers aged 24 or 30 months (2-2.5 years old). In some embodiments, the baby formula composition is suitable for babies under 12 months, such as from birth to 12 months of age.

In some embodiments, the disclosed baby formula compositions may include one or more of natural sugars (i.e., lactose and other mono- and disaccharides, such as fructose, glucose, and sucrose), proteins (e.g., caseins and whey), fats, oils (e.g., sunflower oil, vegetable oil, coconut oil, etc.), arachidonic acid (ARA), docosahexaenoic acid (DHA), calcium salts, potassium salts, sodium salts, magnesium salts, iron, and vitamins and minerals. In some embodiments, the baby formula compositions also include lactose and at least one of high oleic sunflower oil or fractionated coconut oil high in medium-chain fatty acids. In some embodiments, the baby formula compositions further include added nutritional supplements. DHA is an omega-3 fatty acid, ARA is an omega-6 fatty acid, and oleic acid is an omega-9 fatty acid (collectively "omega fatty acids").

Beneficially, the disclosed baby formula compositions enable an easier transition to lactose-based dairy products from baby formulas and/or non-lactose-based products. Enabling an easier transition also beneficially reduces the prevalence of lactose intolerance in wider populations.

Additionally, the disclosed baby formula compositions may be easier for infant and/or toddler digestive systems to handle. In other words, the disclosed baby formula compositions may be easier on infant and/or toddler digestive systems, resulting in better fed infants and/or toddlers.

Further, the disclosed baby formula compositions may beneficially exclude soy, corn syrup, palm oil and/or derivates of soy, corn syrup and/or palm oil. These components are known to have long-term health effects, be tough on young bodies and be detrimental to the environment. For example, palm oils tend to be heavy in long chain fatty acids (rather than the medium chain fatty acids of goat milk), which are harder to digest and thus less readily available as a source of calories. By excluding corn syrup and/or sugars derived from corn syrup, less sugar will be consumed during the formative and developmental years enabling improved nutritional health. The disclosed baby formula compositions may further exclude added hormones and/or genetically modified organisms (GMOs).

Nutritional Characteristics of Goat Milk

Goat milk is easier for a human, particularly young humans such as toddlers, to digest than cow milk. Even though total solids, fat, crude protein, lactose, and ash (mineral) contents of goat milk are almost similar to cow milk, there are important differences in the individual fatty acids, casein fractions and fat globule sizes. Goat milk is mostly water, at approximately 86%. The remaining composition generally includes lipids (fats), accounting for approximately 4.5%; proteins accounting for approximately 3.5%; carbohydrates (such as lactose) accounting for approximately 5%; and ash/minerals which accounting for approximately 1%. To make a dry baby formula, the goat milk is advantageously processed to remove water, yielding a dry goal milk derivative. In addition, the goat milk can include goat milk isolates (e.g., whey and/or goat milk proteins).

Goat milk has a total fat content that is higher than that of cow milk, with roughly 10 grams of fat per cup of goat milk in comparison to 8 grams of fat per cup of cow milk. The most significant difference is not in the amount of fat, however, but in the ratio of fatty acids known as medium chain triglycerides (MCT). Goat milk is known to have a significant proportion of MCTs, which are recognized as highly beneficial to a range of health issues. Goat milk has approximately 35% MCT levels compared to only 17% MCT levels in cow milk. These MCTs provide energy without being deposited in fatty tissue of the body. And at the same time, they have the triple effects of lowering cholesterol, dissolving cholesterol deposits, and preventing cholesterol deposits.

Fat molecule structure, protein density, and the presence of other sugars and natural substances can make foods easier or harder for people to digest. In digestion, size matters. Fat molecules in goat milk are smaller, making them easier to break down with the body's available enzymes. These molecules are evenly dispersed throughout goat milk making it naturally homogenized. On the other hand, cow milk fat molecules are larger and they naturally separate if allowed to settle, forming a thick layer of cream found at the top of non-homogenized milk. The smaller and medium-chain triglyceride fat molecules in goat milk make it easier to digest. There are some indications that the homogenization process damages the quality and healthiness of milk. As goat milk is naturally homogenized, the quality and healthiness of the milk is maintained and preserved.

Protein levels are also found to be higher in goat milk than cow milk, with comparison values of 8.69 grams per cup to 7.86 grams per cup. Goat milk generally has higher levels of the essential amino acids (histidine, isoleucine, leucine, lysine, methionine, phenylalanine, threonine, tryptophan and valine) and higher nutritional values due to the structural differences of proteins in goat milk. All milks contain casein proteins, but the structure of these proteins varies and plays a role in digestibility and allergenicity. Goat milk contains fewer alpha-S-1 casein proteins compared to cow milk, which contribute to dairy allergens and digestibility issues. Beneficially, goat milk is abundant in alpha-S-2 casein proteins, which are non-allergenic.

Lactase is the enzyme associated with breaking down lactose (milk sugar) molecules. Lactase is destroyed during the pasteurization process of cow milk, and humans generally stop producing lactase if not exposed to lactose sugar, which often begins near 5 years old or when milk is no longer consumed. As goat milk contains less lactose than cow milk (by approximately 1%), young humans (e.g., toddlers) are less likely to experience gastric discomfort due to less lactose.

Additionally, the smaller curds and fat molecules, combined with fewer alpha-S-1 casein proteins, means the disclosed formula compositions do not cause gastric discomfort, or cause less gastric discomfort than cow milk-based formulas. The smaller curds, fat molecules, and small- and medium-chain triglycerides do not overwhelm the body's enzymes as they work to break down those components. Further, the smaller curds and fat molecules do not agglomerate while in the stomach, workman meaning the molecules stay smaller longer and are more digestible. This beneficially reduces the likelihood of babies being "colicky."

Goat milk also supplies more Vitamin A than cow milk. The Vitamin A in goat milk is not in the form of beta-carotene as in cow milk. Rather, vitamin A in goat milk is provided in the active, vitamin form. This different form of Vitamin A is what makes goat milk whiter in color than cow milk. Goat milk contains carbohydrates such as lactose, oligosaccharides, glycopeptides, glycol-proteins and nucleotide sugars. Overall, goat milk has fewer total carbohydrates than cow milk, at 10.86 grams per cup versus 11.03 grams per cup. This difference in milk composition is almost exclusively in the levels of lactose.

The mineral composition of goat milk is seen as nutritionally significant in the areas of calcium, phosphorus, potassium, magnesium, manganese and selenium compared to cow milk. Levels of other minerals are comparable to those in cow milk. Minerals in goat milk seem to have better bioavailability.

Goat milk also contains beneficial and healthy oligosaccharides, many of which are structurally similar to oligosaccharides in human breast milk. Human breast milk contains more than 80 milk oligosaccharides (hMOS), with 247 varieties observed and 162 hMOS structurally characterized. Because of its prebiotic and anti-infective properties, hMOS are a major source for early life colonization of gut microbiota in infants. Recent studies have shown that goat milk contains the highest level of oligosaccharides among all domestic animals and has significant similarities to human milk oligosaccharides from a structural point of view. The beneficial oligosaccharides profile of goat milk improves the immune system and gut microbiome, with its attendant benefits. These prebiotic oligosaccharides inhibit pathogen adhesion, stimulate immunity, modulate host receptors, modify epithelial glycosylation, assisting intestinal cell function, stimulates healthy gut microbiome growth, and stimulates healthy brain development.

Goat milk contains a much higher concentration of oligosaccharides than cow milk, with goat milk containing 60-350 mg/L of oligosaccharides in mature milk and up to 2.4 g/L in colostrum, and cow mild containing 30-60 mg/L of oligosaccharides. Moreover, the oligosaccharides in cow milk are less similar to human oligosaccharides than goat milk. Of the about 50 oligosaccharides found in goat colostrum and mature milk, 12 have been observed in human breast milk. Goat milk also have much higher diversity of oligosaccharides than cow milk. Oligosaccharides in goat milk show anti-inflammatory properties.

Baby Formula Compositions

In some embodiments, the disclosed baby formula compositions include approximately 40% to approximately 80% by weight of at one of goat milk derivative or goat milk isolate, with the remainder being made up of added lactose, lipids, micronutrients, vitamins and minerals, and optional proteins. For example, the disclosed baby formula compositions may include about 35%, about 40%, about 45%, about 50%, about 55%, about 65%, about 75%, about 80%, or about 85% by weight dry goat milk, derivative, or isolate, or an amount within a range defined by any two of the foregoing values.

In some embodiments, the baby formula composition may be a low lactose formula that includes approximately 6% to approximately 7% of added lactose. In other embodiments, the baby formula composition may be a medium lactose formula that includes approximately 10% to approximately 20% of added lactose. In still other embodiments, the baby formula composition may be a high lactose formula that includes approximately 25% to approximately 35% added lactose. For example, the disclosed baby formula compositions may include 6%, 7%, 10%, 15%, 20%, 25%, 28%, 30%, or 35% added lactose, or an amount within a range defined by any two of the foregoing values.

In some embodiments, the baby formula composition may be a low fat formula that includes approximately 3% to approximately 6% of one or more added fats (e.g., high oleic sunflower oil and/or high medium-chain fatty acid coconut oil or fraction thereof). In other embodiments, the baby formula composition may be a medium fat formula that includes approximately 8% to approximately 18% of one or more added fats. In still other embodiments, the baby formula composition may be a high fat formula that includes approximately 20% to approximately 30% of one or more added fats. For example, the disclosed baby formula compositions may include 3%, 6%, 8%, 10%, 12%, 15%, 18%, 20%, 22%, 25%, or 30% of one or more added fats, or an amount within a range defined by any two of the foregoing values.

In some embodiments, the baby formula composition may contain approximately 2% to approximately 5% of added protein and approximately 15% to approximately 22% of a variety of other added ingredients. In some embodiments, the baby formula compositions include added protein in a range of approximately 1.8% to approximately 5% by weight, or 1.8 g to 5 g of added protein.

In some embodiments, baby formula compositions include goat milk, lactose and sunflower oil. As used herein, "goat milk" includes raw and/or pasteurized goat milk, derivatives of goat milk (e.g., evaporated goat milk or goat milk yogurt) and/or isolates from goat milk (e.g., whey and/or goat milk proteins). The ratio of goat milk to added lactose may be about 1.5:1, 2:1, 3:1, 4:1, 5:1, 6:1, 7:1, 8:1, 9:1, 10:1, 11:1 12:1, 13:1, or 14:1, or within a range defined by any two of the foregoing ratios. Additionally, and/or alternatively, the ratio of goat milk to oils and fatty acids may range from 7:1 to 80:1. Additionally, and/or alternatively, the ratio of goat milk to added oils and/or fatty acids may be about 1.9:1, 2.5:1, 3:1, 4:1, 5:1, 6:1, 7:1, 8:1, 9:1, 10:1, 11:1. 12:1, 15:1, 18:1, 20:1, 22:1, 25:1, 30:1, 60:1, or 75:1, or within a range defined by any two of the foregoing ratios.

The disclosed baby formula compositions may beneficially include a variety of vitamins and minerals, bringing the disclosed formula compositions more in alignment with human breast milk. For example, the disclosed baby formula compositions may include vitamin A in a range of 200 micrograms (mcg) to 800 mcg. In some embodiments, the baby formula compositions include vitamin D in a range of approximately 30 mcg to 120 mcg. In some embodiments, although variable, the baby formula compositions include vitamin E at a minimum of 0.7 milligrams (mg). In some embodiments, although variable, the baby formula compositions include vitamin K at a minimum of 4 mcg. In some embodiments, although variable, the baby formula compositions include thiamine (vitamin B1) at a minimum of 40 mcg.

In some embodiments, although variable, the baby formula compositions include riboflavin (vitamin B2) at a minimum of approximately 60 mcg. In some embodiments, the baby formula compositions include vitamin B6 in a range of approximately 20 mcg to 60 mcg. In some embodiments, although variable, the baby formula compositions include vitamin B12 at a minimum of approximately 0.15 mcg. In some embodiments, although variable, the baby formula compositions include niacin (vitamin B3) at a minimum of approximately 250 mcg. In some embodiments, although variable, the baby formula compositions include pantothenic acid (vitamin B5) at a minimum of approximately 300 mcg.

In some embodiments, although variable, the baby formula compositions include folic acid at a minimum of approximately 4 mcg. In some embodiments, although variable, the baby formula compositions include vitamin C at a minimum of approximately 8 mg. In some embodiments, although variable, the baby formula compositions include biotin at a minimum of approximately 1.5 mcg. In some embodiments, although variable, the baby formula compositions include choline at a minimum of approximately 7 mg. In some embodiments, although variable, the baby formula compositions include inositol at a minimum of approximately 4 mg.

In some embodiments, the baby formula compositions also include a variety of other nutritional components. For example, in some embodiments, the baby formula compositions also include one or more of natural sugars, proteins (e.g., casein and whey), fats, lactose, oils (e.g., sunflower oil and/or other seed oils such as flaxseed or safflower, vegetable/fruit oils such as avocado oil, coconut oil, cranberry oil, etc.), arachidonic acid (ARA), docosahexaenoic acid (DHA), calcium salts, potassium salts, sodium salts, magnesium salts, iron and/or iron salts, and vitamins and minerals. In some embodiments, the ARA is derived from fish sources. In some embodiments, the DHA is derived from algae sources. DHA is an omega-3 fatty acid, and ARA is an omega-6 fatty acid. In some embodiments, the baby formula compositions additionally include one or more of added medium chain triglycerides (e.g., fatty acids from coconut oil), pantothenic acid, retinyl acetate, cholecalciferol, biotin, copper salts, niacinamide, selenium aspartate, riboflavin, thiamine hydrochloride, pyridoxine hydrochloride, manganese sulfate, cyanocobalamin, potassium iodide and folic acid.

In some embodiments, the baby formula compositions include one or more of ascorbic acid, choline bitartrate, inositol, ascorbic acid, ferrous sulfate, zinc salts and d-alpha tocopherol succinate. In some embodiments, the baby formula compositions include one or more of vitamin K, vitamin E, vitamin A, vitamin B1, vitamin B2, vitamin B3, vitamin B5, vitamin B6, vitamin B12 and vitamin C. In some embodiments, the baby formula compositions include one or more of phosphorous, magnesium, sodium, selenium, manganese and choline. In some embodiments, baby formula compositions include one or more of calcium, potassium, folate, biotin, iodine, zinc, copper, chloride and inositol.

Although variable, the baby formula compositions may include calcium at a minimum of approximately 60 mg. Although variable, the baby formula compositions may include phosphorous at a minimum of approximately 30 mg. Although variable, the baby formula compositions may include magnesium at a minimum level of approximately 6 mg. Although variable, the baby formula compositions may include iron at a minimum of approximately 0.15 mg. Although variable, the baby formula compositions may include zinc at a minimum of approximately 0.5 mg. Although variable, the baby formula compositions may include manganese at a minimum of approximately 5 mcg. Although variable, the baby formula compositions may include copper at a minimum of approximately 60 mcg. Although variable, the baby formula compositions may include iodine in a range of approximately 5 mcg to 80 mcg. Although variable, the baby formula compositions may include selenium in a range of approximately 1.5 mcg to 7.5 mcg. Although variable, the baby formula compositions may include sodium in a range of approximately 15 mg to 65 mg. Although variable, the baby formula compositions may include potassium in a range of approximately 75 mg to 210 mg. Although variable, the baby formula compositions may include chloride in a range of approximately 50 mg to 160 mg. The foregoing ranges may be based on a 1000 calorie diet or intake.

In some embodiments, the goat milk and the variety of other added nutritional components (e.g., macro and micronutrients) are present in the baby formula compositions in a ratio ranging from approximately 25:1 to approximately 1500:1, or from approximately 50:1 to approximately 1000:1. For example, the ratio of goat milk to the variety of other added nutritional components may be about 25:1, 35:1, 50:1, 75:1, 95:1, 100:1, 110:1, 250:1, 300:1, 350:1, 550:1, 650:1, 700:1, 850:1, 900:1, 950:1, 1000:1, 1050:1, 1080:1, 1100:1, 1200:1, or 1500:1, or within a range defined by any two of the foregoing ratios.

Methods of Manufacturing and Administering Baby Formula Compositions

The disclosed formula compositions are manufactured in a cGMP facility, according to the Code of Federal Regulations (CFR) Title 21, to current good manufacturing practices, with quality control procedures, records and reports. Parts 106 and 107 of Title 21 apply to the formula compositions. This represents a special dietary use as food for infants, as a simulation of human breast milk and suitability to be a complete and/or partial substitute for human breast milk.

Also disclosed are methods of manufacturing baby formula compositions. In some embodiments, the method includes mixing the initial ingredients of the baby formula composition together, for example, in a stainless steel vessel. The initial ingredients include, for example, goat milk, lactose, and oils. The method may also include heating the mixed ingredients to at least about 140° F./60° C. The method may further include adding components to the mixture such as additional fats, oils, emulsifiers, and other nutritional components (e.g., minerals, vitamins, proteins, etc.). The mixture may be continually heated and mixed during the addition of the components. The method may include pasteurizing and homogenizing the mixture.

The method may also include standardizing the pasteurized and homogenized mixture. Standardizing the pasteurized and homogenized mixture may include ensuring the pH, fat concentrations, and vitamin/mineral profile of the mixture (and resulting baby formula composition) are correct. The baby formula composition may then be packaged and sterilized. The baby formula composition may be in the form of a powder to be mixed with water or a ready-to-ingest liquid or drink. A powdered form of the baby formula composition may be created by spray drying, roller drying, vacuum evaporation, freeze-drying, drum-drying, evaporation and/or other drying techniques.

Also disclosed are methods of preventing childhood obesity, diabetes, and/or risk of heart disease. The methods include administering an effective amount of the disclosed baby formula composition. Administering an effective amount of the disclosed baby formula compositions provides an infant, toddler or child with a nutritional composition that is substantially similar to human milk. Additionally, administering an effective amount of the baby formula compositions beneficially reduces the amount of processed sugars, and indigestible fats and carbohydrates consumed during the developmental and formative childhood years. By reducing the consumption of processed sugars, fats, and carbohydrates, administration of the baby formula compositions prevents and/or reduces the rate of childhood obesity and diabetes. Obesity and diabetes are known to onset early in life with a correlation of increased consumption of processed sugars and fats. By providing the infant, toddler, and/or child with all the nutrients they need for development, and by omitting processed sugars and fats, the baby formula compositions thereby prevents and/or reduces childhood obesity, heart disease, and/or diabetes. Additionally, the disclosed baby formula compositions provide a nutritional profile that is substantially the same or similar to that of breast milk, meaning the infant, toddler and/or child is getting all the nutrients they need to fully and adequately develop into adults.

EXAMPLES

Example 1

An example of the disclosed baby formula compositions includes goat milk, lactose, high oleic sunflower oil, and other added ingredients. When combined, the resulting baby formula composition contains the nutritional facts outlined in Table 1, based on a two (2) scoop serving size (or a serving size of approximately 21.2 g). % Daily Values are based on a 1,000 calorie per day diet. The vitamin and mineral content of the baby formula composition is outlined in Table 2.

TABLE 1

| Ingredient | Amount | % Daily Value |
|---|---|---|
| Total Fat | 5 g | 13 |
| saturated fat | 2.5 g | 25 |
| trans fat | 0 g | |

TABLE 1-continued

| Ingredient | Amount | % Daily Value |
|---|---|---|
| Cholesterol | 5 mg | 2 |
| Sodium | 37 mg | 2 |
| Total Carbohydrate | 11 g | 7 |
| Dietary Fiber | 0 g | 0 |
| Total Sugars* | 9 g | 24 |
| *includes 6 g added sugar | | |
| Protein | 3 g | 23 |

TABLE 2

| Ingredient | Amount | % Daily Value |
|---|---|---|
| Vitamin A | 90 mcg RAE | 30 |
| Vitamins B | | |
| B1 | 100 mcg | 20 |
| B2 | 160 mcg | 32 |
| B3 | 300 mcg NE | 5 |
| B5 | 600 mcg | 30 |
| B6 | 65 mcg | 13 |
| B12 | 0.300 mcg | 33 |
| Vitamin C | 12 mg | 80 |
| Vitamin D | 1.25 mcg | 8 |
| Vitamin E | 1.34 mcg | 22 |
| Vitamin K | 11 mcg | 37 |
| Biotin | 4 mcg | 50 |
| Calcium | 151 mg | 22 |
| Choline | 10 mg | 5 |
| Chloride | 70 mg | 5 |
| Copper | 80 mcg | 27 |
| Folate | 27 mcg DFE | 18 |
| Iodine | 15 mcg | 17 |
| Iron | 1.8 mg | 26 |
| Magnesium | 17 mg | 21 |
| Manganese | 15 mcg | 1 |
| Potassium | 195 mg | 7 |
| Selenium | 2.5 mcg | 13 |
| Zinc | 1 mg | 33 |

TABLE 1

| | | |
|---|---|---|
| Magnesium | 17 mg | 21 |
| Manganese | 15 mcg | 1 |
| Potassium | 195 mg | 7 |
| Selenium | 2.5 mcg | 13 |
| Zinc | 1 mg | 33 |

Table 1

Example 2

A two (2) fluid ounce (fl. oz) formula serving was prepared by adding one (1) unpacked level scoop (approximately 10.6 grams) of a disclosed powdered baby formula composition to approximately 2 fl. oz (or 60 mL) of warm water. The mixture was shaken to ensure the powder adequately dissolved and integrated into the water. Each scoop adds approximately 0.2 fl. oz. to the amount of prepared formula.

The powdered baby formula composition included goat milk, lactose and high oleic sunflower oil. The powdered baby formula composition also included calcium phosphate, ARA, DHA, potassium chloride, sodium chloride, magnesium sulfate, choline bitartrate, inositol, ascorbic acid, ferrous sulfate, zinc sulfate, d-alpha tocopherol succinate, vitamin K, medium chain triglycerides, pantothenic acid, retinyl acetate, cholecalciferol, biotin, copper sulfate, niacinamide, selenium aspartate, riboflavin, thiamine hydrochloride, pyridoxine hydrochloride, manganese sulfate, cyanocobalamin, potassium iodide and folic acid.

Example 3

A four (4) fl. oz formula serving was prepared by adding two (2) unpacked level scoops (approximately 21.2 grams) of the powdered baby formula composition from Example 2 to approximately 4 fl. oz (or 120 mL) of warm water. The mixture was shaken to ensure the powder adequately dissolved and integrated into the water. Each scoop adds approximately 0.2 fl. oz. to the amount of prepared formula.

Example 4

A six (6) fl. oz formula serving was prepared by adding three (3) unpacked level scoops (approximately 31.8 grams) of the powdered baby formula composition from Example 2 to approximately 6 fl. oz (or 180 mL) of warm water. The mixture was shaken to ensure the powder adequately dissolved and integrated into the water. Each scoop adds approximately 0.2 fl. oz. to the amount of prepared formula.

Example 5

An eight (8) fl. oz formula serving was prepared by adding four (4) unpacked level scoops (approximately 42.4 grams) of the powdered baby formula composition from Example 2 to approximately 8 fl. oz (or 240 mL) of warm water. The mixture was shaken to ensure the powder adequately dissolved and integrated into the water. Each scoop adds approximately 0.2 fl. oz. to the amount of prepared formula.

Example 6

The disclosed baby formula composition was prepared. The prepared baby formula composition included approximately 65-75% goat milk (derivatives and/or isolates), 6-7% added lactose, added 3-6% fat (e.g., high oleic sunflower oil), approximately 2-5% protein, and approximately 15-22% of a variety of other added ingredients. The variety of other ingredients, and their minimum amounts, are outlined below in Table 3. It is to be understood that the amounts recited in Table 3 reflect a floor, or the minimum values, of the baby formula compositions. However, each ingredient may be included in a greater amount than the minimum, such as one-and-a-half, two, three, four, six, eight or ten times higher, and so on. The following values are based on a 1000 calorie diet or intake.

TABLE 3

| Ingredient | Minimum Amount |
|---|---|
| Vitamin A | 250-750 mcg |
| Vitamins B | |
| B1 | 40 mcg |
| B2 | 60 mcg |
| B3 | 250 mcg |
| B5 | 300 mcg |
| B6 | 35 mcg |
| B12 | 0.150 mcg |
| Vitamin C | 8 mg |
| Vitamin D | 40-100 mcg |
| Vitamin E | 0.70 mcg |
| Vitamin K | 4 mcg |
| Biotin | 1.5 mcg |
| Calcium | 60 mg |

TABLE 3-continued

| Ingredient | Minimum Amount |
|---|---|
| Choline | 7 mg |
| Chloride | 55-150 mg |
| Copper | 60 mcg |
| Folate | 4 mcg |
| Iodine | 6-75 mcg |
| Iron | 0.15-3 mg |
| Magnesium | 6 mg |
| Manganese | 5 mcg |
| Potassium | 80-200 mg |
| Selenium | 2-7 mcg |
| Zinc | 0.5 mg |

Example 6

Baby formula compositions were prepared by combining the following components in Table 4:

TABLE 4

| | | |
|---|---|---|
| Goat milk powder | 8-12 g | 40-60 wt % |
| Lactose powder | 5-7 g | 25-35 wt % |
| High oleic sunflower oil powder | 4-6 g | 20-30 wt % |
| DHA/ARA/MCT oil powder | 0.28-0.4 g | 1.4-2 wt % |
| Premix vitamins/minerals | 0.4-0.5 g | 2-2.5 wt % |

In some embodiments, the amounts of the components can be as follows: goat milk powder—about 8.5 g, about 9.0 g, about 9.5 g, about 10 g, about 10.5 g, about 11 g, or about 11.5 g (e.g., about 9.5 g); lactose powder—about 5.5 g, about 6.0 g, or about 6.5 g (e.g., 6.0 g); high oleic sunflower oil powder—about 4.3 g, about 4.6 g, about 4.9 g, about 5.2 g, about 5.5 g, or about 5.8 g, (e.g., 4.9 g); DHA/ARA/MCT oil powder—about 0.32 g, about 0.34 g, about 0.36 g, or about 0.38 g (e.g., about 0.34 g); Premix vitamins/minerals—about 0.42 g, about 0.44 g, about 0.46 g, or about 0.48 g (e.g., about 0.46 g).

In some embodiments, the weight percent of the components can be as follows: goat milk powder—about 42.5 wt %, about 45 wt %, about 47.5 wt %, about 50 wt %, about 52.5 wt %, about 55 wt % or about 57.5 wt % (e.g., about 44.8 wt %); lactose powder—about 26 wt %, about 28 wt %, about 30 wt %, about 32 wt %, or about 34 wt % (e.g., about 28.3 wt %); high oleic sunflower oil powder—about 21 wt %, about 23 wt %, about 25 wt %, about 27 wt %, or about 29 wt % (e.g., about 23.1 wt %); DHA/ARA/MCT oil powder—about 1.5 wt %, about 1.6 wt %, about 1.7 wt %, about 1.8 wt %, or about 1.9 wt % (e.g., about 1.6 wt %); premix vitamins/minerals—about 2.1 wt %, about 2.17 wt %, about 2.19 wt %, about 2.22 wt %, about 2.25 wt %, about 2.3 wt %, about 2.35 wt %, about 2.4 wt %, or about 2.45 wt % (e.g., about 2.17 wt %).

Additional Terms & Definitions

While certain embodiments of the present disclosure have been described in detail, with reference to specific configurations, parameters, components, elements, etcetera, the descriptions are illustrative and are not to be construed as limiting the scope of the claimed invention.

Furthermore, it should be understood that for any given element of component of a described embodiment, any of the possible alternatives listed for that element or component may generally be used individually or in combination with one another, unless implicitly or explicitly stated otherwise.

In addition, unless otherwise indicated, numbers expressing quantities, constituents, distances, or other measurements used in the specification and claims are to be understood as optionally being modified by the term "about" or its synonyms. When the terms "about," "approximately," "substantially," or the like are used in conjunction with a stated amount, value, or condition, it may be taken to mean an amount, value or condition that deviates by less than 20%, less than 10%, less than 5%, less than 1%, less than 0.1%, or less than 0.01% of the stated amount, value, or condition. At the very least, and not as an attempt to limit the application of the doctrine of equivalents to the scope of the claims, each numerical parameter should be construed in light of the number of reported significant digits and by applying ordinary rounding techniques.

Any headings and subheadings used herein are for organizational purposes only and are not meant to be used to limit the scope of the description or the claims.

It will also be noted that, as used in this specification and the appended claims, the singular forms "a," "an" and "the" do not exclude plural referents unless the context clearly dictates otherwise. Thus, for example, an embodiment referencing a singular referent (e.g., "widget") may also include two or more such referents.

It will also be appreciated that embodiments described herein may also include properties and/or features (e.g., ingredients, components, members, elements, parts, and/or portions) described in one or more separate embodiments and are not necessarily limited strictly to the features expressly described for that particular embodiment. Accordingly, the various features of a given embodiment can be combined with and/or incorporated into other embodiments of the present disclosure. Thus, disclosure of certain features relative to a specific embodiment of the present disclosure should not be construed as limiting application or inclusion of said features to the specific embodiment. Rather, it will be appreciated that other embodiments can also include such features.

The invention claimed is:

1. A baby formula composition comprising: at least one of goat milk, goat milk isolate, derivative or goat milk derivative isolate; added lactose; one or more added oils that provide at least one of oleic acid or medium-chain fatty acids and which are selected from the group consisting of coconut oil, sunflower oil, marine-sourced oil, cranberry seed oil, chia seed oil, safflower oil, and soy oil; and a plurality of nutritional additives selected from the group consisting of calcium phosphate, arachidonic acid (ARA), decosahexaenoic acid (DHA), oleic acid, potassium chloride, sodium chloride, magnesium sulfate, choline bitartrate, inositol, ascorbic acid, ferrous sulfate, zinc sulfate, d-alpha tocopherol succinate, vitamin K, medium chain triglycerides, pantothenic acid, retinyl acetate, cholecalciferol, biotin, copper sulfate, niacinamide, selenium aspartate, riboflavin, thiamine hydrochloride, pyridoxine hydrochloride, manganese sulfate, cyanocobalamin, potassium iodide and folic acid, wherein the composition omits sheep milk, wherein a weight ratio of the at least one of goat milk, goat milk isolate, or goat milk derivative to the one or more added oils is in a range of about 4:1 to about 80:1; and wherein the composition omits fucoidan and derivatives thereof carbohydrates other than carbohydrates provided by the at least one goat milk derivative or goat milk isolate, the lactose, and optional natural sugars.

2. The baby formula composition of claim 1, wherein the baby formula composition is a powder composition that can be added to water, drink, or food.

3. The baby formula composition of claim 2, wherein the composition comprises approximately 40% to 80% by weight of the at least one of goat milk, goat milk isolate, or goat milk derivative.

4. The baby formula composition of claim 2, wherein the composition comprises approximately 6% to 35% by weight of the added lactose.

5. The baby formula composition of claim 1, wherein a weight ratio of the at least one of goat milk, goat milk isolate, or goat milk derivative to the added lactose is in a range of about 1.5:1 to about 14:1.

6. The baby formula composition of claim 5, wherein the weight ratio of the at least one of goat milk, goat milk isolate, or goat milk derivative to the added lactose is in a range of about 2:1 to about 13:1.

7. The baby formula composition of claim 1, wherein the weight ratio of the at least one of goat milk, goat milk isolate, or goat milk derivative to the one or more added oils is in a range of 8:1 to 75:1.

8. The baby formula composition of claim 1, wherein the wherein the one or more added oils comprise sunflower oil.

9. The baby formula composition of claim 1, wherein the one or more added oils comprise coconut oil or fractionated coconut oil.

10. The baby formula composition of claim 1, wherein the wherein the one or more added oils comprise at least one marine-sourced oil selected from fish and algae.

11. The baby formula composition of claim 1, wherein the one or more added oils also provide one or more omega fatty acids selected from docosahexaenoic acid (DHA), arachidonic acid (ARA), and oleic acid.

12. The baby formula composition of claim 1, wherein the plurality of nutritional additives comprise or are provided by one or more of extracts from fish, extracts from algae, extracts from coconut oil, vitamins, and minerals.

13. A baby formula composition comprising: water; at least one of goat milk, goat milk isolate, or goat milk derivative; added lactose; one or more added oils that provide at least one of oleic acid or medium-chain fatty acids and which are selected from the group consisting of coconut oil, sunflower oil, marine-sourced oil, cranberry seed oil, chia seed oil, safflower oil, and soy oil; and a plurality of nutritional additives selected from the group consisting of calcium phosphate, arachidonic acid (ARA), decosahexaenoic acid (DHA), oleic acid, potassium chloride, sodium chloride, magnesium sulfate, choline bitartrate, inositol, ascorbic acid, ferrous sulfate, zinc sulfate, d-alpha tocopherol succinate, vitamin K, medium chain triglycerides, pantothenic acid, retinyl acetate, cholecalciferol, biotin, copper sulfate, niacinamide, selenium aspartate, riboflavin, thiamine hydrochloride, pyridoxine hydrochloride, manganese sulfate, cyanocobalamin, potassium iodide and folic acid, wherein the composition omits sheep milk, wherein a weight ratio of the at least one of goat milk, goat milk isolate, or goat milk derivative to the added lactose is in a range of about 4:1 to about 14:1, and wherein the composition omits fucoidan and derivatives thereof.

14. The baby formula composition of claim 13, wherein the composition comprises approximately 40% to 80% by weight of the at least one of goat milk, goat milk isolate, or goat milk derivative, exclusive of the water.

15. The baby formula composition of claim 13, wherein a weight ratio of the at least one of goat milk, goat milk isolate, or goat milk derivative to the added lactose is in a range of about 5:1 to about 14:1.

16. The baby formula composition of claim 13, wherein a weight ratio of the at least one of goat milk, goat milk isolate, or goat milk derivative to the one or more added oils is in a range of 7:1 to 80:1.

17. A baby formula composition comprising: at least one of goat milk, goat milk isolate, or goat milk derivative at a concentration of approximately 35% to 85% by weight of the composition; added lactose, wherein a weight ratio of the at least one goat milk isolate or goat milk derivative to the added lactose is in a range of about 1.5:1 to about 14:1; one or more added oils that provide at least one of oleic acid or medium-chain fatty acids and which are selected from the group consisting of coconut oil, sunflower oil, marine-sourced oil, cranberry seed oil, chia seed oil, safflower oil, and soy oil, wherein a weight ratio of the at least one of goat milk, goat milk isolate, or goat milk derivative to the one or more added oils is in a range of about 44.9:1 to about 80:1; and a plurality of nutritional additives selected from the group consisting of calcium phosphate, arachidonic acid (ARA), decosahexaenoic acid (DHA), oleic acid, potassium chloride, sodium chloride, magnesium sulfate, choline bitartrate, inositol, ascorbic acid, ferrous sulfate, zinc sulfate, d-alpha tocopherol succinate, vitamin K, medium chain triglycerides, pantothenic acid, retinyl acetate, cholecalciferol, biotin, copper sulfate, niacinamide, selenium aspartate, riboflavin, thiamine hydrochloride, pyridoxine hydrochloride, manganese sulfate, cyanocobalamin, potassium iodide and folic acid, wherein the composition omits sheep milk, wherein the composition omits fucoidan and derivatives thereof, wherein the composition is a powder composition that can be added to water, liquid, or food.

18. The baby formula composition of claim 17, wherein the composition comprises approximately 40% to 80% by weight of the at least one of goat milk, goat milk isolate, or goat milk derivative.

19. The baby formula composition of claim 17, wherein a weight ratio of the at least one of goat milk, goat milk isolate, or goat milk derivative to the added lactose is in a range of 2:1 to 14:1.

20. The baby formula composition of claim 17, wherein a weight ratio of the at least one of goat milk, goat milk isolate, or goat milk derivative to the one or more added oils is in a range of about 7:1 to about 80:1.

* * * * *